United States Patent
Lewis, Jr. et al.

(10) Patent No.: US 6,621,687 B2
(45) Date of Patent: Sep. 16, 2003

(54) MICRO-SUPERCAPACITOR

(75) Inventors: David H. Lewis, Jr., Irvine, CA (US); John J. Waypa, Rancho Palos Verdes, CA (US); Erik K. Antonsson, Pasadena, CA (US); Charles D. E. Lakeman, Albuquerque, NM (US)

(73) Assignees: Northrop Grumman Corporation TPL, Inc., Redondo Beach, CA (US); TPL, Inc., Albuquerque, NM (US); California Institute of Technology, Pasadena, CA (US)

( * ) Notice: Subject to any disclaimer, the term of this patent is extended or adjusted under 35 U.S.C. 154(b) by 0 days.

(21) Appl. No.: 09/948,033

(22) Filed: Sep. 5, 2001

(65) Prior Publication Data

US 2003/0043533 A1 Mar. 6, 2003

(51) Int. Cl.[7] ................................................. H01G 9/04
(52) U.S. Cl. ...................... 361/511; 361/303; 361/508; 361/509; 361/520; 429/218
(58) Field of Search ................... 361/511, 508, 361/509, 512, 503, 520, 535, 523, 578, 272, 516; 429/218

(56) References Cited

U.S. PATENT DOCUMENTS

| | | | | |
|---|---|---|---|---|
| 3,925,098 A | * | 12/1975 | Saunders et al. | 136/6 |
| 4,012,562 A | * | 3/1977 | Saunders | 429/103 |
| 5,041,946 A | * | 8/1991 | Iseki | 361/523 |
| 5,151,848 A | * | 9/1992 | Finello | 361/502 |
| 5,426,561 A | | 6/1995 | Yen et al. | |
| 5,429,893 A | * | 7/1995 | Thomas | 429/218 |
| 5,659,457 A | * | 8/1997 | Lian et al. | 361/502 |
| 5,872,698 A | * | 2/1999 | Bai et al. | 361/503 |
| 5,928,808 A | * | 7/1999 | Eshraghi | 429/41 |
| 5,989,300 A | * | 11/1999 | Eshraghi | 29/623.1 |

\* cited by examiner

*Primary Examiner*—Anthony Dinkins
*Assistant Examiner*—Nguyen Ha
(74) *Attorney, Agent, or Firm*—Katten Muchin Zavis Rosenman

(57) ABSTRACT

A microelectronic supercapacitor is amenable to being fabricated using micro electromechanical systems (MEMS) techniques. By utilizing MEMS techniques, the supercapacitor in accordance with the present invention can be formed with volumes <1 mm$^3$. As such, such microelectronic supercapacitor is suitable for use in applications in which only a few millimeters are available for both a supercapacitor and an energy storage device, such as a battery.

7 Claims, 3 Drawing Sheets a  Cell separator (polymer)
b  Electrolyte/polymer matrix layer
c  Composite carbon + metal oxide electrode
d  Insulator
e  Top Spiral Configuration Planar Layer Supercapacitor in a Volume Package

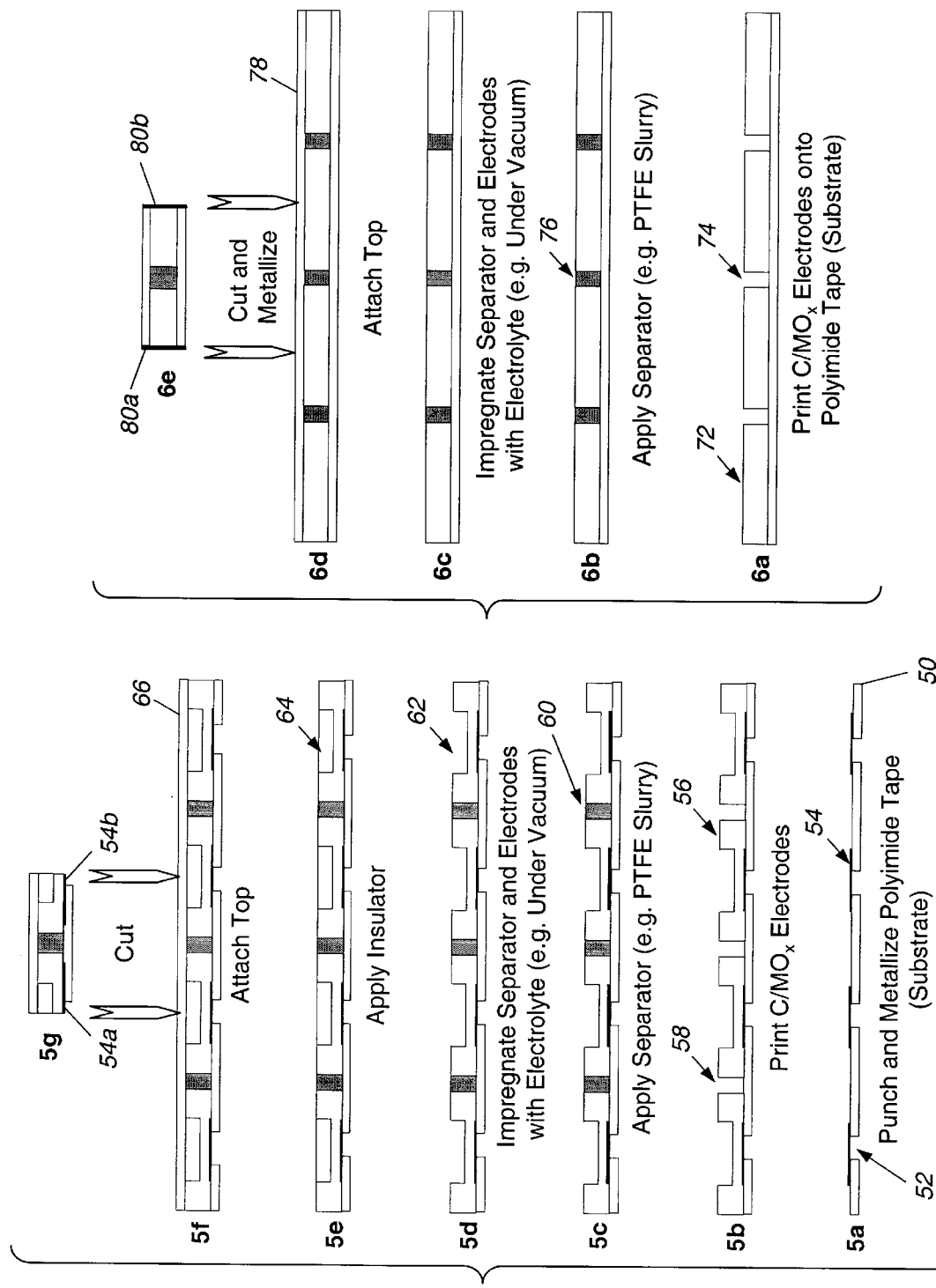

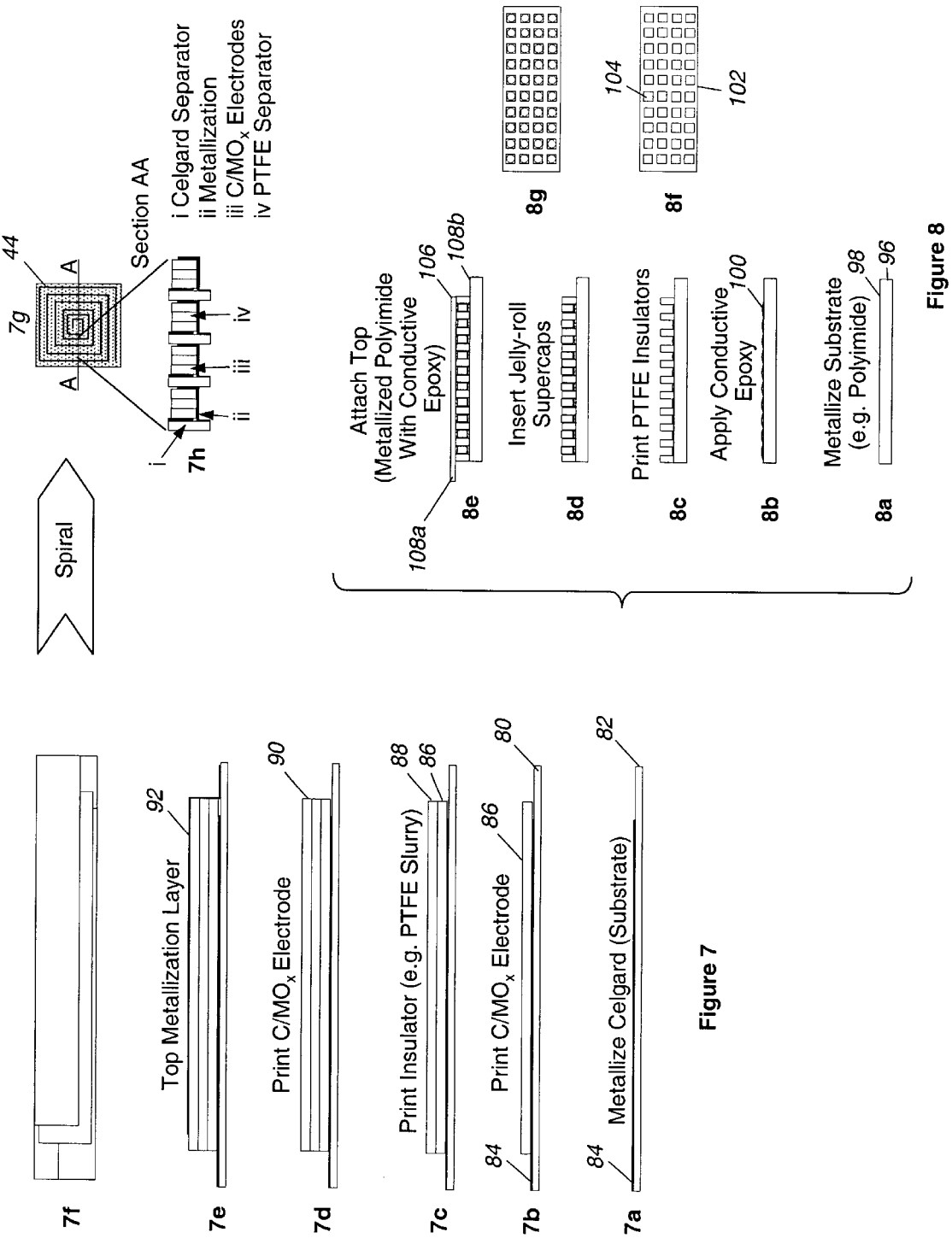

US 6,621,687 B2

MICRO-SUPERCAPACITOR

CROSS REFERENCE TO RELATED APPLICATIONS

This application is related to commonly-owned co-pending patent application Ser. No. 09/948,034, entitled "Volumetric Micro Batteries", filed on Sep. 5, 2001.

BACKGROUND OF THE INVENTION

1. Field of the Invention

The present invention relates to supercapacitors and more particularly to microelectronic supercapacitors formed from micro electromechanical systems (MEMS) techniques formed with volumes $\leq 1$ mm$^3$.

2. Description of the Prior Art

Supercapacitors are generally known in the art. Examples of such supercapacitors are disclosed in U.S. Pat. Nos. 5,151,848 and 5,426,561, hereby incorporated by reference. In general, such supercapacitors relate to high surface area capacitors, such as double layer capacitors, which can provide up to 2000 times the volumetric capacitance of conventional electrolytic capacitors.

Various applications exist which require power supplies including capacitors that are limited in size to a few cubic millimeters of volume. Examples of such applications include high-speed electronic applications that require on-chip/on-board power supplies to prevent local current starvation. Other applications include microsensors and military applications, such as precision munition systems.

Supercapacitors are known to be used with power supplies to speed up the delivery of the electric energy stored in a battery to a load. More particularly, power supplies are formed from energy storage devices, such as a battery. Such energy storage devices are normally characterized by energy density (i.e. energy stored per unit of volume or mass) and power (how fast the energy can be delivered). In order to increase the power or rate at which the energy within the battery can be delivered to a load, supercapacitors are known to be coupled to the battery. Unfortunately, known supercapacitors are component size (i.e. much larger than a few millimeters of volume) and are thus not suitable for use in the various applications discussed above. Thus, there is a need for supercapacitor having a total volume of less than a few cubic millimeters.

SUMMARY OF THE INVENTION

The present invention relates to a microelectronic supercapacitor that is amenable to being fabricated using micro electromechanical systems (MEMS) techniques. By utilizing MEMS techniques, the supercapacitor in accordance with the present invention can be formed with volumes $\leq$mm$^3$. As such, such microelectronic supercapacitors are suitable for use in applications as discussed in which only a few cubic millimeters are available for both a supercapacitor and an energy storage device, such as a battery.

DESCRIPTION OF THE DRAWINGS

These and other advantages of the present invention will be readily understood from the following specification and attached drawings wherein:

FIGS. 5A–5G are process diagrams illustrating the process for fabricating a microcapacitor with an insulator in accordance with the present invention in which both electrodes are in the same plane.

FIGS. 6A–6E represent an alternate embodiment illustrating the process for fabricating a microcapacitor without an insulator in accordance with the present invention in which the electrodes are located in different planes.

FIGS. 7A–7H are process diagrams illustrating the process for fabricating a micro-supercapacitor having a jelly roll configuration in accordance with an alternate embodiment of the present invention.

FIGS. 8A–8G are process diagrams for fabricating an array of micro-supercapacitors in accordance with the present invention.

DETAILED DESCRIPTION

The present invention relates to a supercapacitor and in particular to a microelectronic supercapacitor formed with a volume $\leq 1$ mm$^3$, making it suitable for applications which require power supplies including supercapacitors within a volume of less than a few cubic millimeters. The supercapacitors are formed using micro electromechanical systems (MEMS) manufacturing processes, such as soft lithography processes used for non-silicon materials, such as ceramics, polymers and plastics, and are thus about 1000 times smaller by volume than conventional supercapacitors. Another important aspect of the invention is that the supercapacitor has a relatively high specific power storage characteristic, for example approximately 10,000 watts/kg, higher than any other stored energy device including batteries and fuel cells. An exemplary supercapacitor in accordance with the present invention, operating at about 2.8 volts formed with an organic electrolyte provides 5 mF of capacitance with 10 mW power for about 0.7 seconds.

Figure 1:
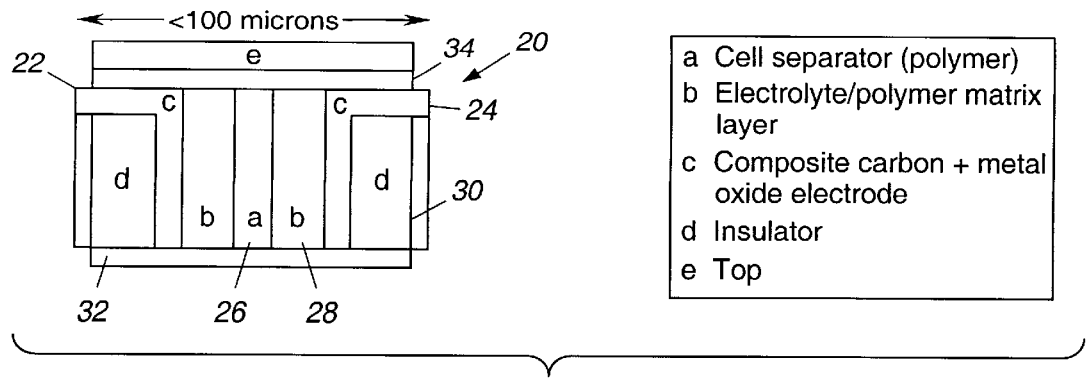
FIG. 1 is a sectional view of a microelectronic supercapacitor in accordance with the present invention.
Figure 2:
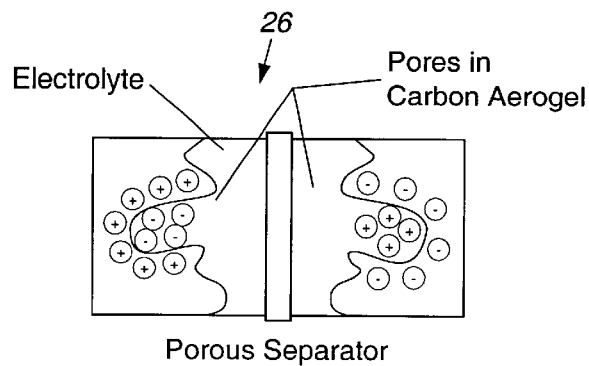
FIG. 2 further illustrates the cell separator, which forms a portion of the supercapacitor in accordance with the present invention.
Figure 3:
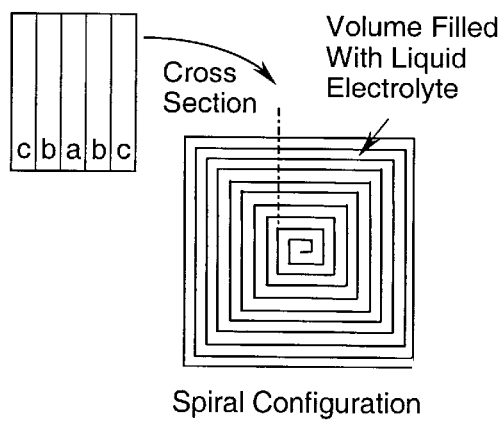
FIG. 3 illustrates an alternate embodiment of the supercapacitor with a jelly roll geometry which maximizes the surface area for increased capacitance energy storage.
Figure 4:
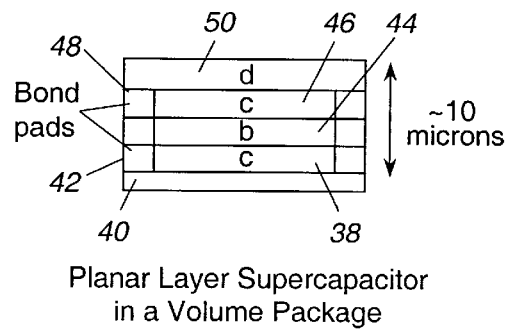
FIG. 4 illustrates another embodiment of the supercapacitor formed from planar layers.

FIGS. 1 and 2 represent one embodiment of the supercapacitor in accordance with the present invention. FIG. 3 illustrates a spiral or jelly roll configuration in which the surface area is maximized for increased capacitance and energy storage. FIG. 4 relates to yet another embodiment in which multiple supercapacitors in parallel are created using volume stacking.

Referring to FIG. 1, the supercapacitor, generally identified with the reference numeral 20, includes two electrodes 22 and 24 and a porous polymer separator 26. The volume between the porous polymer separator 26 and the electrodes 22 and 24 form an electrolyte tank with two cavities for receiving of an electrolyte 28. An insulator 30 is used to form a generally circular sidewall.

The electrodes 22, 24, polymer separator 26 and the insulator sidewall 30 form an electrolyte tank carried by a substrate 32, for example silicon wafers, glass slides or polyimide flexible substrates. The substrate 32 closes the bottom of the electrolyte tank. The top of the electrolyte tank is closed by an insulated top 34 to provide a sealed device.

The electrode 22 and 24 can be formed from various materials. Exemplary materials include carbon, carbon aerogel, metal oxides or a combination of these materials. Carbon and carbon aerogel electrodes provide relatively large internal surface areas, for example, approximately 2500 m² per gram of material, which provides a relatively large surface interface between the electrolyte 28 and the electrodes 22 and 24.

Various materials are suitable for the electrolyte 28. For example, both solid and liquid electrolytes are suitable. Liquid electrolytes may include caustic or acid electrolytes. Examples of liquid electrolytes include aqueous or organic salt/solvent systems; the solvent can be selected from: water, propylene carbonate, propylene carbonate/diethylcarbonate, 1,3 dioxolane and tetrahydrofuran; the salts include: lithium perchlorate, tetrabutylammonium tetraphenylborate, tetraethylphosphonium tetrafluoroborate, and tetraethylammonium tetrafluoroborate. Examples of solid electrolytes include hydrated Nafion® (a registered trademark of DuPont) electrolyte. The specific electrolyte selected determines the operating voltage of the supercapacitor, which strongly contributes to the stored energy (i.e. $E=\frac{1}{2} CV^2$).

The separator 26 together with the electrodes 22 and 24 form two electrolyte cavities 28 to create a double layer of electrolyte 28 as shown. The separator 26 may be formed from an organic polymer, such as Celgard®, PTFE or any organic polymer that is charge permeable.

As shown, in FIG. 2 the porous separator is used to enable electronic separation of the electrodes while allowing passage of ionic species. It is the accumulation of ions at the electrodes that provides the high charge storage capacity for supercapacitors.

In accordance with an important aspect of the invention, the supercapacitor may be formed from MEMS processes and, in particular, soft lithography processes, as discussed above. Two embodiments of a micro-supercapacitor are illustrated in FIGS. 5A–5G and 6A–6E. The embodiment illustrated in FIGS. 5A–5G illustrates an embodiment of a micro-supercapacitor with an insulator in which the electrodes are formed in a common plane. The embodiment illustrated in FIGS. 6A–6E illustrates an embodiment without an insulator in which the electrodes are formed in different planes.

Referring first to FIGS. 5A–5G, initially a substrate 50, for example, polyimide tape, is punched as illustrated in FIG. 5A. As shown, the apertures, generally identified with the reference numeral 52, are bridged by metal contacts, generally identified with the reference numeral 54. The metal contacts 54 are deposited by conventional metal deposition techniques. After the metal contacts 54 are deposited on the substrate 50, a plurality of electrodes, generally identified with the reference numeral 56, for example, carbon metal oxide composite materials (C/MO$_x$) electrodes, as discussed above, are printed on top of the contacts 54 by conventional techniques, as generally illustrated in FIG. 5B. As shown in FIG. 5B, the electrodes 56 are separated defining cavities, generally identified with the reference numeral 58 therebetween. As shown in FIG. 5C, a separator 60, for example, a PTFE slurry, is applied in each of the cavities 58, as generally shown in FIG. 5C. Next, as illustrated in FIG. 5D, the separator 60 and electrodes 56 are impregnated with an electrolyte, for example, as discussed above, under vacuum.

As shown in FIGS. 5B–5D, the electrodes 56 are formed in a generally c-shape defining cavities, generally identified with the reference numeral 62. These cavities 62 in the electrodes 56 are filled with an insulator, generally identified with the reference numeral 64, as shown in FIG. 5E. The insulator 64 is applied by conventional techniques and may include any of the insulators discussed above. After the insulator is applied as shown in FIG. 5E, a cap layer 66 is formed over the entire array of capacitors. The cap layer 66 may be formed from materials, similar to the substrate, such as silicon, glass or polyimide tape. Lastly, the array of micro-supercapacitors are cut as generally shown in FIGS. 5F and 5G. As shown in FIG. 5G, the contacts identified with the reference numeral 54A and 54B are formed in the same plane.

Referring to FIG. 6A a substrate 70, for example, polyimide tape, is provided. A number of electrodes, generally identified with the reference numeral 72, for example, C/MO$_x$ electrodes, as discussed above, are printed on the substrate 70 by conventional techniques to form an array of electrodes with gaps therebetween, generally identified with the reference numeral 74. As shown in FIG. 6B, a separator, for example, PTFE slurry, identified with the reference numeral 76, is applied within the cavity 74. The separator 76 is applied by conventional techniques. Subsequently, as shown in FIG. 6C, the electrodes 72 and separator 76 are impregnated with an electrolyte, for example, as discussed above, under a vacuum, as generally shown in FIG. 6C. Next, as shown in FIG. 6D, a cap 78, as discussed above, is applied to the top of the structure. Subsequently, as illustrated in FIG. 6E, the array of micro-supercapacitors are cut and contacts 80A and 80B are formed on opposing sides by conventional metal deposition techniques.

In order to provide an increased surface area for increasing the capacitance of the device, a jelly roll geometry may be provided for increased capacitance for energy storage. As mentioned above, energy storage $E=\frac{1}{2} CV^2$. By increasing the capacitance, the energy storage capability is greatly increased.

FIGS. 7A–7H are process diagrams which illustrate the process for forming micro-supercapacitors with a spiral or jelly roll configuration. FIGS. 8A–8G illustrate the process for forming an array of micro-supercapacitors with a jelly roll configuration. Referring to first to FIGS. 7A–7H, a substrate 82, for example, a Celgard® substrate, is provided. A metal contact layer 84 is deposited on the substrate 82 by conventional metal deposition techniques, as generally illustrated in FIG. 7A. As shown in FIG. 7B, an electrode layer 86 is deposited on top of the metallization layer 84, such that the metallization layer 84 extends beyond the electrode layer 86 on one end and the electrode layer 86 overhangs the metallization layer 84 on the opposing end, as generally shown in FIG. 7B. Next, an insulator layer 48, for example, PTFE slurry, is formed on top of the electrode layer 86. As shown in FIG. 7D another electrode layer 90, for example, a C/MO$_x$ electrode layer, as discussed above, is formed on top of the insulator layer 88 by conventional techniques. A top metallization 92 is formed on top of the electrode layer 90 by conventional metal deposition techniques as generally shown in FIG. 7E. FIG. 7F is a top view of the structure illustrated in FIG. 7E.

In order to create a spiral or jelly roll configuration as illustrated in FIG. 7G, the substrate illustrated in FIG. 7F is rolled up. The ends may be secured with a suitable epoxy.

FIGS. 8A–8G illustrate a process for forming an array of micro-supercapacitors with a jelly roll configuration. Initially, a substrate 96, for example, a polyimide substrate, is provided. A metallization layer 98 is provided on top of the substrate 96 and covered with a conductive epoxy 100 as generally illustrated in FIG. 8B. An array of insulators 102, for example, as illustrated in FIG. 8F is formed on top of the conductive epoxy 100 by conventional techniques. The micro-supercapacitors 94 with a jelly roll configuration are disposed within the cavities, generally identified with the reference numeral 104, as generally shown in FIGS. 8B and 8G. As generally shown in FIG. 3, an electrolyte is disposed in the cavities of the before a top layer 106 is formed on top of the array. The top layer may be formed, for example, with metallized polyimide with conductive epoxy to form an array of micro-supercapacitors, as generally shown in FIG. 8E, with contacts 108*a* and 108*b*.

FIG. 4 illustrates another alternate embodiment of the invention in which the supercapacitor 20 is formed from relatively planar stacked layers separated by insulators. In particular, a first electrode 38, formed on a substrate 40, for example silicon wafers, glass slides or polyimide flexible substrates. The first electrode 38 is connected to a bond pad 42 formed on the edge of the substrate 40 by conventional metal deposition techniques. An electrolyte layer 44 is disposed on top of the first electrode 38. A second electrode 46 is formed on top of the electrolyte 44. The second electrode 46 is connected to a bond pad 48 also formed on the edge of the substrate 40 by conventional metal deposition techniques. An insulator 50 is formed on top of the electrode 46. The micro-supercapacitor illustrated in FIG. 4 may be formed by the process as generally illustrated in FIGS. 7A–7F.

Many modifications and variations of the present invention are possible in light of the above teachings. Thus, it is to be understood that, within the scope of the appended claims, the invention may be practiced otherwise than as specifically described above.

What is claimed and desired to be covered by a Letters Patent is as follows:

We claim:

1. A micro-supercapacitor comprising:
   a substrate;
   a pair of spaced apart electrodes;
   a separator disposed between said spaced apart electrodes defining a pair of cavities between said separator and said electrodes;
   a porous insulator disposed on an outside surface of said spaced apart electrodes; and
   a top layer closing said pair of cavities.

2. A micro-supercapacitor comprising:
   a substrate formed with a plurality of spaced apart apertures;
   a metallization layer formed on top of said plurality of spaced apart apertures;
   an electrode layer formed on top of said metallization layer and said substrate, said electrode layer formed with a plurality of spaced apart electrodes defining side cavities therebetween, each electrode also formed with a top cavity;
   a separator disposed in said side cavities;
   an insulator disposed in said top cavities;
   an electrolyte impregnated into said separator and said electrodes; and
   a cap layer disposed on top of said electrodes, separators and said insulators forming a layered structure, wherein said layered structure is adapted to be cut into a plurality of micro-supercapacitors.

3. A micro-supercapacitor comprising:
   a substrate;
   a pair of spaced apart electrodes, each electrode formed with a top cavity;
   a porous separator disposed between said pair of spaced apart electrodes;
   an insulator disposed in each of said top cavities in said electrodes;
   an electrolyte;
   a cap layer disposed on top of said spaced apart electrodes and said separator; and
   a metal contact formed on each of said electrodes.

4. A micro-supercapacitor comprising:
   a substrate;
   a pair of spaced apart electrodes disposed on said substrate defining side cavities therebetween;
   a separator disposed in said side cavities between said spaced apart electrodes in contact therewith;
   a cap layer disposed on top of said electrodes and said separator;
   a pair of metal contacts disposed adjacent said electrodes; and
   an electrolyte.

5. A micro-supercapacitor comprising:
   a substrate;
   a first metallization layer;
   a first electrode layer;
   an insulator layer;
   a second electrode layer and;
   a second metallization forming a first layer defining a planar structure, said structure rolled into a spiral configuration and cut into a plurality of spiral supercapacitors.

6. The micro-supercapacitor as recited in claim 5, further including:
   a second substrate;
   a metallization layer formed on top of said second substrate;
   a conductive epoxy disposed on top of said metallization layer;
   an array of insulators formed on top of said conductor epoxy defining a plurality of cavities for receiving said plurality of spiral supercapacitors;
   a top; and
   a electrolyte.

7. A micro-supercapacitor comprising:
   a substrate;
   a first electrode layer fanned on said substrate;
   an electrolyte layer formed on said first electrode layer;
   a second electrode layer formed on said electrolyte layer; and
   an insulator formed on said second electrode layer forming a layered structure.

* * * * *

UNITED STATES PATENT AND TRADEMARK OFFICE
CERTIFICATE OF CORRECTION

PATENT NO. : 6,621,687 B2 Page 1 of 1
DATED : September 16, 2003
INVENTOR(S) : David H. Lewis, Jr. et al.

It is certified that error appears in the above-identified patent and that said Letters Patent is hereby corrected as shown below:

Column 1,
Line 8, after "CROSS-REFERENCE TO RELATED APPLICATION" and before the "BACKGROUND OF THE INVENTION"

-- GOVERNMENT RIGHTS
The U.S. Government has a paid-up license in this invention and the right in limited circumstances to require the patent owner to license others on reasonable terms as provided for by the terms of Contract Numbers MDA972-02-C-0065 and MDA972-02-C-0040 awarded by the Defense Advanced Research Project Agency. --

Signed and Sealed this

Second Day of March, 2004

JON W. DUDAS
*Acting Director of the United States Patent and Trademark Office*